United States Patent [19]

George

[11] Patent Number: 4,478,388
[45] Date of Patent: Oct. 23, 1984

[54] PLUG VALVE WITH REMOVABLE LIP INSERT MEANS

[75] Inventor: John A. George, Cincinnati, Ohio
[73] Assignee: Xomox Corporation, Cincinnati, Ohio
[21] Appl. No.: 438,039
[22] Filed: Nov. 1, 1982
[51] Int. Cl.³ .............................................. F16K 5/02
[52] U.S. Cl. ..................................... 251/309; 251/314
[58] Field of Search ............... 251/309, 310, 311, 312, 251/313, 314

[56] References Cited

U.S. PATENT DOCUMENTS 2,529,412 11/1950 Parker .................................. 251/310

FOREIGN PATENT DOCUMENTS 32038 7/1981 European Pat. Off. ............ 251/310

Primary Examiner—Martin P. Schwadron
Assistant Examiner—James R. Shay
Attorney, Agent, or Firm—Kinney and Schenk

[57] ABSTRACT

A plug valve and method of making same are provided wherein such valve has lip inserts removably installed between an outer housing of the valve and diametrically opposed ports in a plastic sleeve which serves as a liner for the inside surface of the outer housing. The ports are aligned in a flow passage through the valve and a rotatable plug member is rotatably supported within the sleeve. The lip inserts serve the multiple purpose of protecting edge surfaces defining the ports of the sleeve against impingement of fluid flowing through the flow passage, holding the sleeve against rotation, preventing cold flow or extrusion of parts of the plastic sleeve in the flow passage and providing smooth uninterrupted flow of fluid through the valve flow passage.

24 Claims, 11 Drawing Figures

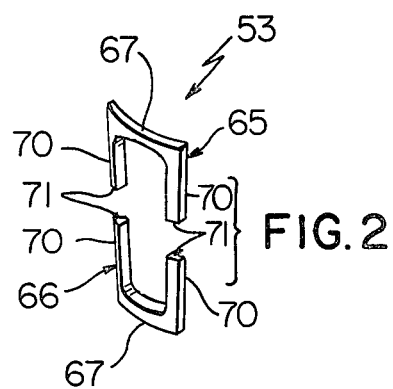
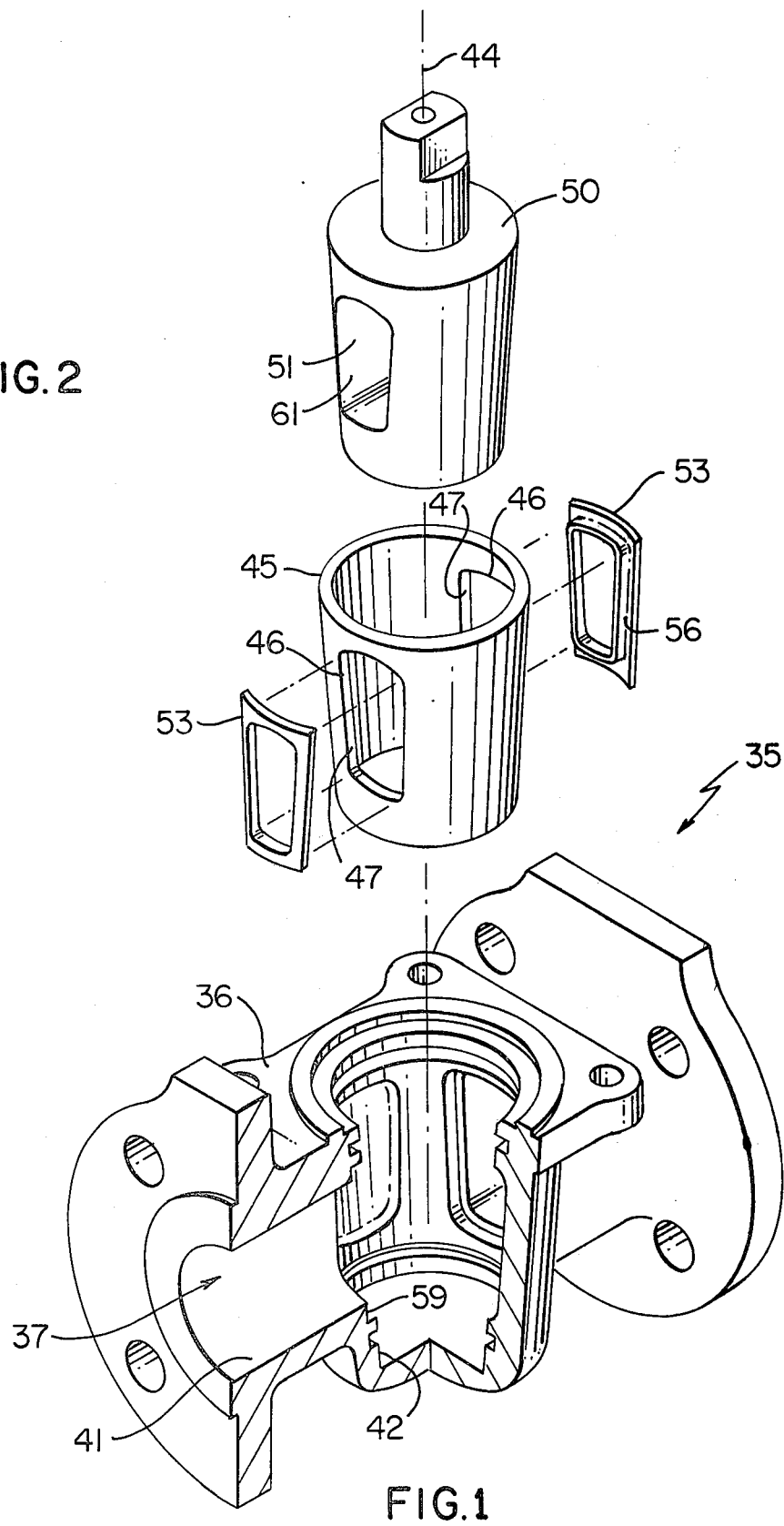

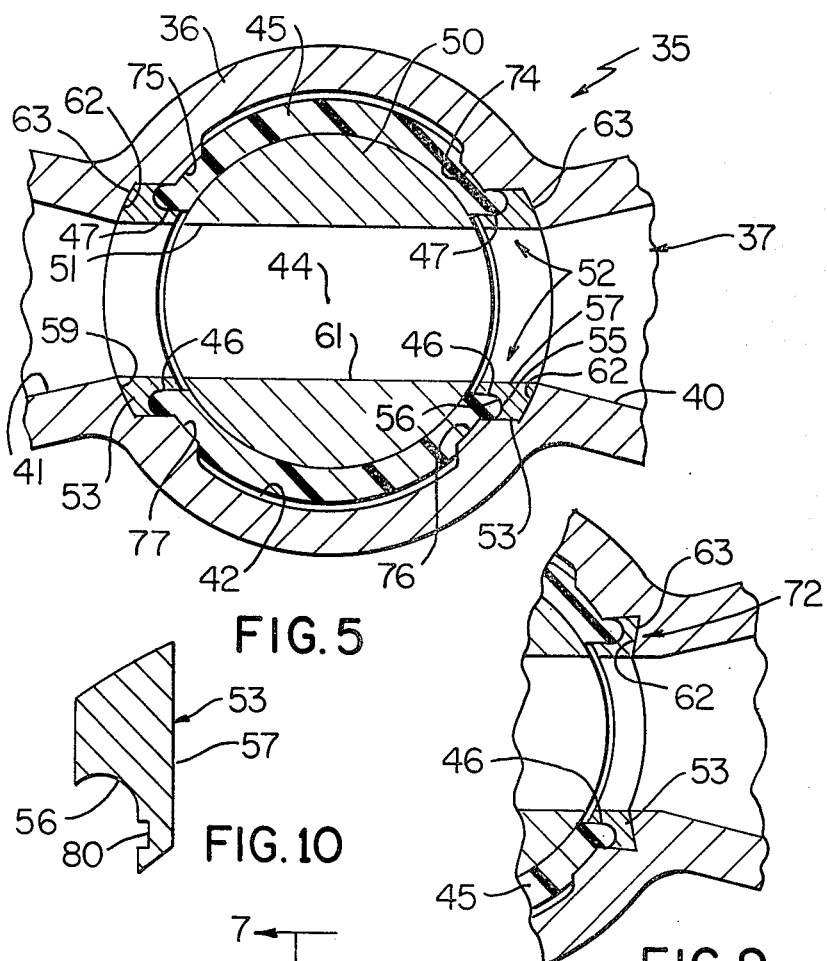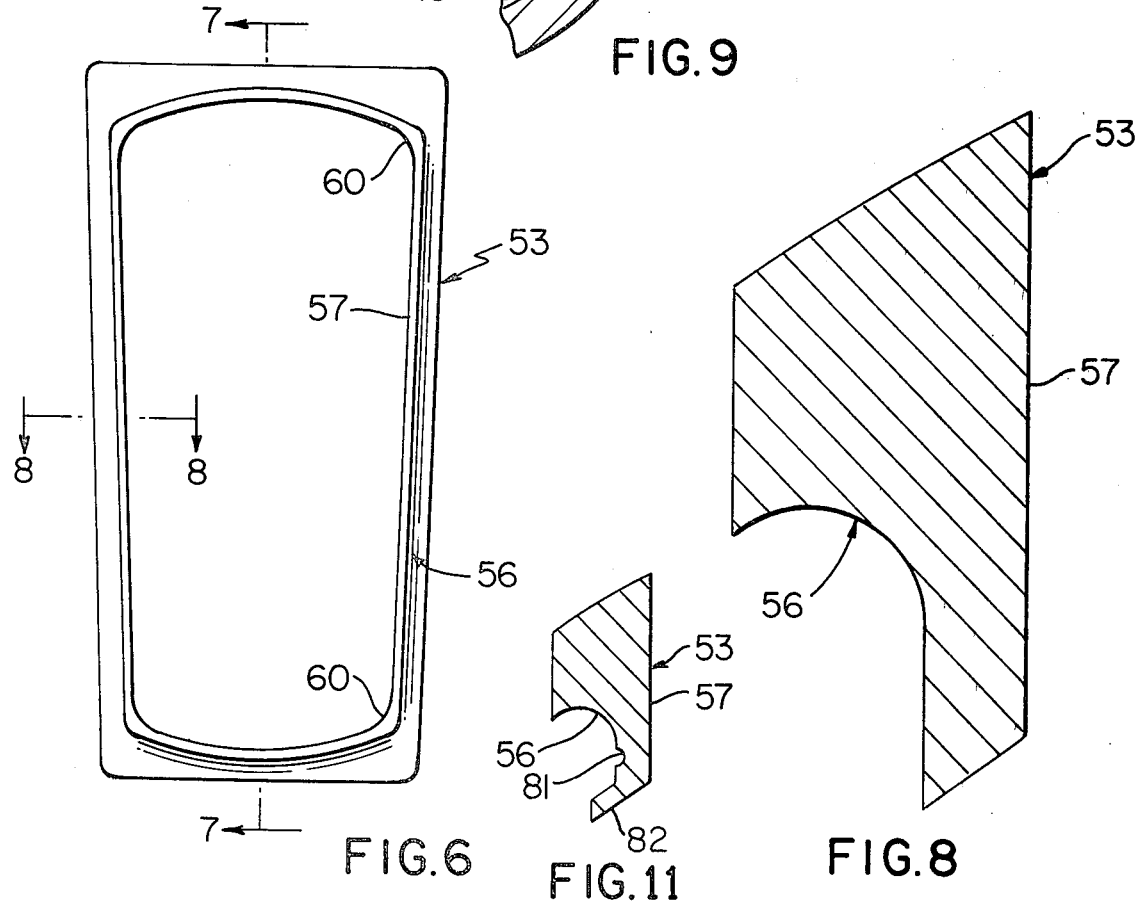

4,478,388

PLUG VALVE WITH REMOVABLE LIP INSERT MEANS

BACKGROUND OF THE INVENTION

1. Field of the Invention

This invention relates to a plug valve and to a method of making such valve.

2. Prior Art Statement

It is known in the art to provide a plug valve for controlling fluid flow therethrough, with such valve having an outer housing or body which has a flow passage extending through the housing and including an inlet and an outlet interconnected by a bore disposed therebetween. The bore has a central axis disposed substantially perpendicular to the flow passage and a plastic sleeve is disposed within the housing and lines the bore. The plastic sleeve has a pair of aligned ports therein at diametrically opposed locations with each port being defined by annular edge surface means. The ports are aligned with the inlet and outlet to enable fluid flow through the passage. In such a plug valve a rotatable plug is disposed within the sleeve and the plug has an opening therethrough which is adapted to be aligned in and out of registry with the inlet and outlet in accordance with rotation of the plug relative to the sleeve and housing. The plug valve also has means for holding the sleeve against rotation relative to the housing. In such a prior valve, the plastic sleeve provides the primary fluid seal for the valve. Further, the holding means generally consists of what will be referred to as body lips defined as an integral part of the valve body and such lips are associated with the inlet and outlet in the housing. The lips of a typical known valve shield the plastic sleeve liner from direct impingement of fluid flowing through the valve and protect it from any abrasive material entrained in the fluid. The body lips also prevent rotation of the sleeve liner relative to the valve body whenever the plug member is rotated between open and closed positions.

It is common practice in such a prior plug valve to use a sleeve liner of polytetrafluoroethylene or equivalent material and with such a sleeve liner there is a strong tendency for the liner to be drawn toward the center line of the valve when the rotatable plug portion is in a nearly closed position. When the plug member is in this nearly closed position, the velocity of the fluid proximal to the side of the port is markedly increased with a resultant decrease in pressure. This reduction in pressure tends to pull and dislocate the plastic sleeve liner. The body lips also serve to prevent inward deflection of the plastic sleeve liner under these flow conditions and such body lips also prevent cold flow or extrusion of parts of the sleeve liner into the flow passage.

In the past, these body lips have been made as an integral part of the valve outer housing or body, as by casting. However, the casting of these lips in the valve body increases the manufacturing cost of such valve body and makes machining of the valve body very expensive. In addition, the body lips also cause problems in the assembly of the plastic sleeve liner in the valve body and these problems add to the cost of the overall valve.

It is also common practice with prior art plug valves to replace the entire outer housing or body once the body lips become damaged or defective. However, once a plug valve is in field service, such replacement is often difficult. Moreover, the special tooling and manufacturing techniques required in the assembly of a sleeve type liner in a valve body having body lips make in-field replacement of the sleeve type liners very difficult.

In view of the above, it is clear that prior art plug valves have numerous deficiencies.

SUMMARY OF THE INVENTION

This invention provides an improved plug valve for controlling fluid flow therethrough which overcomes the above-mentioned deficiencies. The improved plug valve has an outer housing or body which has a flow passage extending through the housing and including an inlet and an outlet interconnected by a bore disposed therebetween. The bore has a central axis disposed substantially perpendicular to the flow passage and a plastic sleeve is disposed within the housing and lines the bore. The plastic sleeve has a pair of aligned ports therein at diametrically opposed locations with each port being defined by annular edge surface means. The ports are aligned with the inlet and outlet to enable fluid flow through the passage. In such a plug valve a rotatable plug is disposed within the sleeve and the plug has an opening therethrough which is adapted to be aligned in and out of registry with the inlet and outlet in accordance with rotation of the plug relative to the sleeve and housing. The plug valve also has means for holding the sleeve against rotation relative to the housing.

In accordance with one embodiment of the improved plug valve of this invention the holding means comprises removable lip insert means of roughly annular outline disposed against one of the edge surface means with the lip insert means serving the multiple purpose of protecting the one edge surface means against impingement by fluid flowing through the flow passage, holding the sleeve against the said rotation, preventing cold flow or extrusion of parts of the plastic sleeve in the flow passage and providing smooth uninterrupted flow of the fluid through the passage.

The improved plug valve of this invention also preferably has at least another removable lip insert means which is substantially identical to the first-named lip insert means and the other lip insert means is disposed against the other of the edge surface means with the other lip insert means also serving a multiple purpose identical to the first-named multiple purpose.

Accordingly, it is an object of this invention to provide an improved plug valve of the character mentioned.

Another object of this invention is to provide an improved method of making a plug valve of the character mentioned.

Other features, objects, uses, and advantages of this invention are apparent from a reading of this description which proceeds with reference to the accompanying drawings forming a part thereof.

BRIEF DESCRIPTION OF THE DRAWINGS

The accompanying drawings show present preferred embodiments of this invention, in which FIG. 1 is an exploded isometric view with parts in cross section and parts broken away of one exemplary embodiment of the plug valve of this invention having removable lip insert means;

FIG. 2 is an isometric view of a modification of the lip insert means;

FIG. 5 is a cross-sectional view similar to FIG. 3 of the improved plug valve of this invention which shows the rotary plug member, sleeve, and lip insert means or inserts installed in position within the outer housing;

FIG. 6 is a view in elevation of one of the lip inserts utilized in the valve of FIG. 5;

FIG. 7 is a cross-sectional view taken essentially on the line 7—7 of FIG. 6;

FIG. 8 is an enlarged cross-sectional view of the lip insert taken essentially on the line 8—8 of FIG. 6;

FIG. 9 is a view similar to the right hand portion of FIG. 5 and illustrating a modification of a lip insert in the valve of FIG. 5;

FIG. 10 is a cross-sectional view similar to FIG. 8 of another modification of a lip insert which is drawn to a smaller scale; and FIG. 11 is a view simlar to FIG. 10 showing still another modification of a lip insert

DETAILED DESCRIPTION

Figure 3:
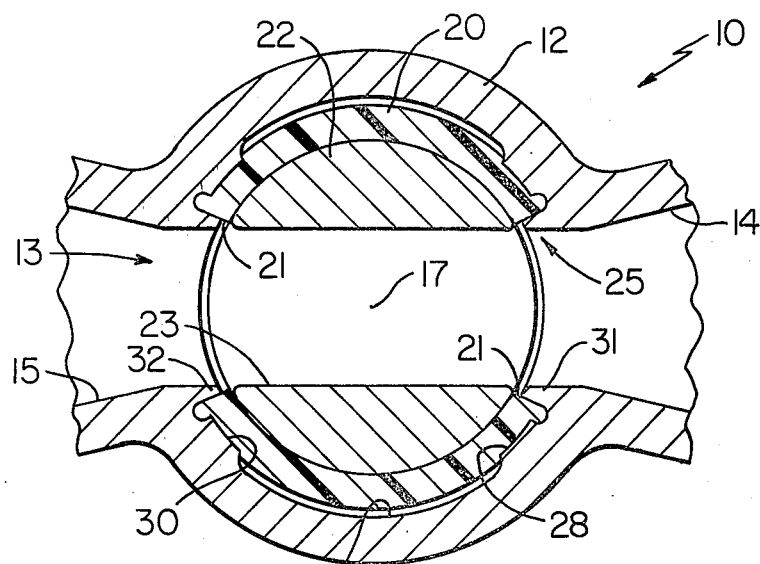
FIG. 3 is a cross-sectional view of a prior art plug valve.

Reference is now made to FIG. 3 of the drawings which shows a prior art plug valve 10 in a cross-sectional view, and such plug valve 10 is provided for controlling fluid flow therethrough.

The valve 10 has an outer body portion or housing 12 and a flow passage 13 extending through the housing and including an inlet 14 and an outlet 15 interconnected by a bore 16 disposed therebetween. The bore 16 has a central axis 17 disposed substantially perpendicular to the flow passage 13.

The valve 10 also has a plastic sleeve 20 disposed within the housing and lining the bore 16 and the sleeve has a pair of aligned ports therein at diametrically opposed locations and each port is designated by the same reference numeral 21 and is defined by annular edge surface means. The ports 21 are aligned with the inlet 14 and outlet 15 to enable fluid flow through the passage 13.

A rotatable plug 22 is disposed within the sleeve 20 and the plug has an opening 23 therethrough which is adapted to be aligned in and out of registry with said inlet 14 and outlet 15 in accordance with rotation of the plug 22 relative to the sleeve 20 and housing 12. The plug valve also has means holding the sleeve 20 against rotation relative to the housing 12 and such means is designated generally by the reference numeral 25.

The plug 22 is rotatable about the axis 17 (which extend perpendicular to the plane of the FIG. 3 illustration); and, rotation may be achieved using means which are well known in the art. The plastic sleeve 20 may be formed of polytetrafluorethylene, for example, and is fitted concentrically around the rotatable plug 22 and interposed between the plug 22 and the housing 12.

A pair of body pressure ribs 28 and 30 circumscribe the inlet and outlet ports 14 and 15 respectively and extend radially into the bore 16 to provide high pressure sealing areas for the plug 22. Primary sealing in the valve 10 occurs between the rotatable plug 22 and the sleeve 20 opposite the high pressure ribs 28 and 30.

The sealing of a valve using high pressure ribs is well known in the art and is described in detail in U.S. Pat. No. 2,994,504, whereby further description thereof will be omitted in the interest of brevity. The description in this patent is incorporated herein by reference thereto.

Interposed between the high pressure ribs 28 and 30 and their respective inlet and outlet ports 14 and 15 are what will be referred to as body lips 31 and 32 with lip 31 circumscribing inlet port 14 and lip 32 circumscribing the outlet port 15. These lips 31 and 32 define previously mentioned holding means 25 and such lips serve to protect the sleeve and to prevent it from rotating relative to the body 21 when the plug 22 is rotated about the axis 17. The lips 31 and 32 also overcome the tendency of the sleeve 20 to pull toward the center of the bore 16, especially when the plug member 22 is in a nearly closed position and high velocity fluid is flowing about the inlet 14 of the valve 10. The high velocity fluid flow generally results in a correspondingly low pressure at the high velocity flow location and in the absence of holding means such as lips 31 and 32 the sleeve 20 would frequently be pulled out of position at the high velocity flow location proximal the inlet 14 when the plug valve is rotated to the nearly closed position. The lips 31 and 32 also protect the sleeve 20 from direct contact with the fluid flowing through the valve 10 and from abrasive materials which may be contained therein; and, lips 31-32 also prevent cold flow or extrusion of parts of the sleeve 20 into the flow passage. The prior art body lips 31 and 32 are intricately formed in the body 12 and require special fabricating techniques. These lips 31 and 32 are also difficult to produce and thus have added greatly to the cost of the valve body 12. In addition, the lips 31 and 32 represent the most vulnerable part of the valve body 12, from a damage viewpoint. After the valve 10 has been placed in field service, damage to the lips 31 and 32 is most difficult and sometimes impossible to repair, whereby any damage thereto often necessitates replacement of the entire valve body 12.

The above description of the prior art plug valve 10 shown in FIG. 3 has been presented to highlight the structure of such prior art valve. However, the disclosure will now proceed with a detailed description of the plug valve of this invention; and, for this description reference is now first made to FIGS. 1 and 5 of the drawings.

The plug valve of this invention is also for controlling fluid flow therethrough and such valve is designated generally by the reference numeral 35. The valve 35 has an outer body portion or an outer housing 36 and a flow passage which is designated generally by the reference numeral 37 which extends through the housing and includes an inlet 40 and an outlet 41 interconnected by bore 42 disposed therebetween. The bore has a central axis 44 which is disposed substantially perpendicular to the flow passage 37 and a plastic sleeve 45 is provided and disposed within the housing 36 and lining the bore 42 in such housing 36.

The sleeve 45 has a pair of aligned ports provided therein and each port is designated by the same reference numeral 46. The ports 46 are provided in the sleeve 45 at diametrically opposed locations and each port 46 is defined by what will be referred to as annular edge surface means 47. The ports 46 are aligned with the inlet 40 and outlet 41 to enable fluid flow through the flow passage 37.

The valve 35 also has a rotatable plug 50 which is disposed within the passage 37 and such plug has an opening 51 therethrough which is adapted to be aligned in and out of registry with the inlet 40 and outlet 41 in accordance with rotation of the plug 40 relative to the plastic sleeve 45 and the housing 36. The valve 35 also has means designated generally by the reference numeral 52 in FIG. 5 for holding the sleeve 45 against rotation relative to the housing 36 and such means 52 will be described in detail subsequently.

The holding means 52 of this invention comprises removable lip insert means, shown in FIG. 1 as a pair of removable lip insert means or lip inserts and each lip insert is designated by the same reference numeral 53. Each lip insert means or lip insert 53 serves the multiple purpose of protecting an associated annular edge surface means 47 against impingement by fluid flowing through the flow passage 37, holding the plastic sleeve 45 against rotation, preventing cold flow or extrusion of parts of the plastic sleeve 45 in the flow passage 37 and providing smooth uninterrupted flow of fluid through such flow passage 37. Each lip insert 53 also serves as a smooth transition structure between the housing 36 and the opening 51 in the plug 50 once such plug is in its open position. Each annular lip insert 53 has a roughly rectangular peripheral outline and in the illustration of FIGS. 1 and 6 each lip insert 53 is a single-piece construction.

As previously mentioned the sleeve 45 has ports 46 therein defined by edge surface means 47. As best seen in FIG. 5 of the drawings each of the edge surface means 47 when viewed in cross section at any location on the periphery thereof has a nonrectilinear convex roughly L-shaped surface wherein one leg thereof is curved and may be considered an approximately J-shaped surface 55. Similarly each annular lip insert means or lip insert 53 when installed in the valve 35 and viewed in cross section at the same said location has a corresponding nonrectilinear concave roughly L-shaped surface which is an approximately J-shaped surface 56 which is disposed against the surface 55 in a hooking manner. In this manner it will be appreciated that each lip insert 53 is, in essence, installed in position with minimum likelihood of movement due to the intermeshing of the roughly L-shaped surfaces 55 and 56 along their full surface extent.

Figure 4:
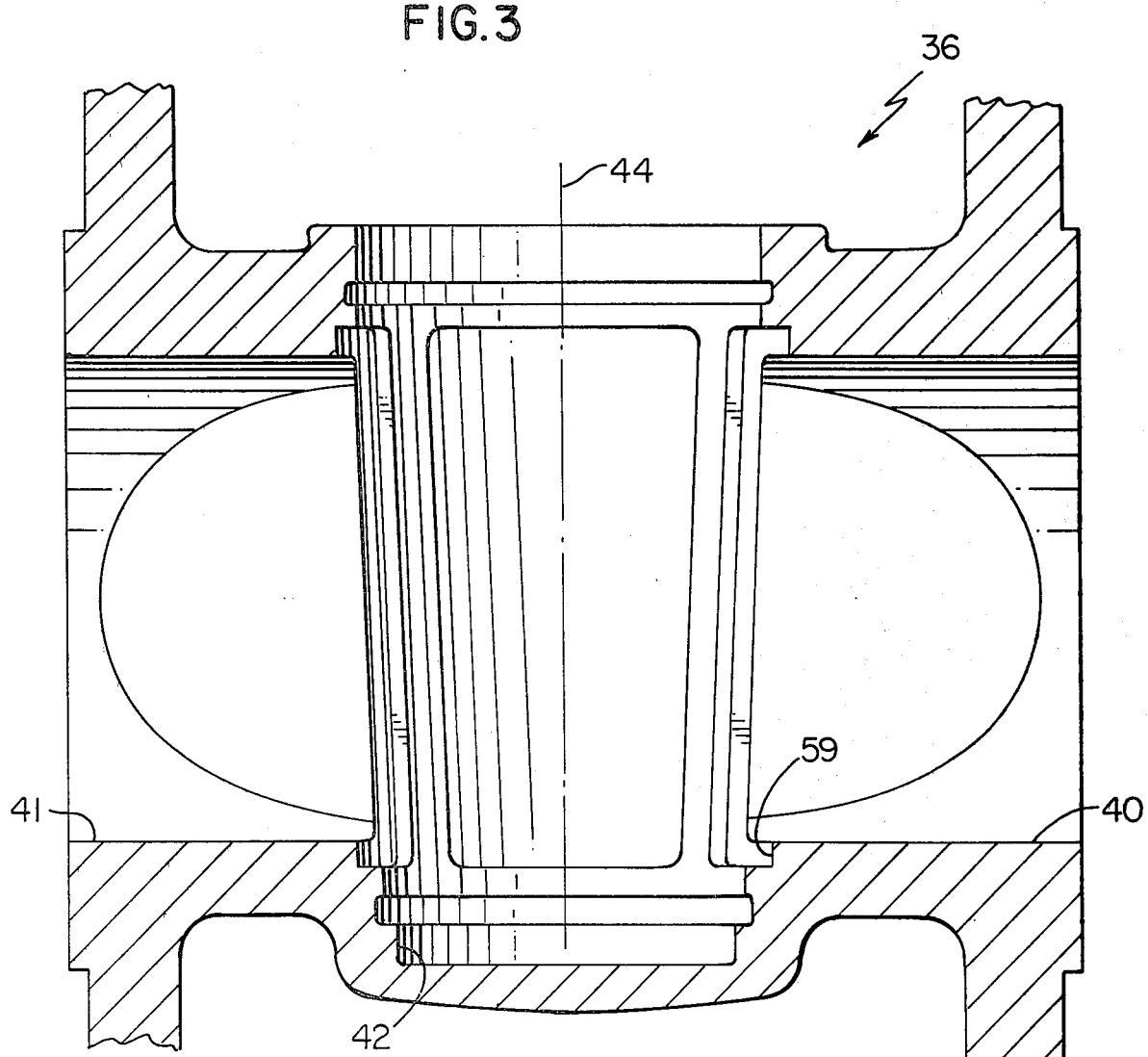
FIG. 4 is a cross-sectional view through the valve housing or body of the plug valve of this invention prior to installing the various components therewithin.

Each annular lip insert 53 also has an inside surface 57 (FIGS. 5 and 7) which serves as a smooth transition wall between the opening 51 in the plug 50 and its associated portion of the flow passage 37 through the housing 36. The surface or wall 57 has a width 58 which is dimensioned such that it is received snugly within an associated annular cutout 59, as shown in FIGS. 4 and 5, in the housing 36. The annular wall or inside surface 57 is of roughly rectangular peripheral outline and has rounded inside corners with a typical rounded corner being shown at 60 in FIGS. 6 and 7. The inside surface 57 corresponds in size and outline to the inside surface 61 (FIG. 1) defining the opening 51 in the plug 50.

Referring again to FIG. 5 it is seen that the housing 36 has an annular retaining shoulder 62 associated with its inlet 40 and a substantially identical annular retaining shoulder also designated by the reference numeal 62 associated with its outlet 41. Each of the retaining shoulders 62 cooperates with an associated L-shaped edge surface means of the sleeve 45 to confine the associated lip insert 53 therebetween and confine such lip insert against movement along the flow passage 37. Each of the retaining shoulders 62 defines a wall or surface of an associated annular cutout 59.

As will be readily apparent from FIG. 5 each of the annular retaining shoulders 62 when viewing one side thereof on any cross section normal to the one side is curved in a concave manner facing toward the central axis 44 of the bore 42. It will also be appreciated that the lip insert means or lip insert 53 associated with a particular retaining shoulder 62 has a retained surface 63 which is correspondingly curved in a convex manner away from the central axis 44. Each annular retained surface 63 engages an associated annular retaining shoulder 62 along substantially its full extent.

Having described the valve 35 with its holding means 52 comprising annular lip insert means in the form of a single-piece lip insert 53, reference is now made to FIG. 2 of the drawings which illustrates a modification of the lip insert means which consists of a pair of cooperating U-shaped members 65 and 66. Each of the U-shaped members has a bight 67 and a pair of substantially parallel legs 70.

Each pair of the U-shaped members 65 and 66 defining an annular lip insert means 53 is disposed with the terminal ends 71 of the parallel legs 70 thereof in abutting relation and defining the rectangular outline of the associated lip insert means 53. It will be appreciated that the lip insert means 53 comprised of a pair of cooperating U-shaped members as shown in FIG. 2 may be used interchangeably with the single-piece lip insert means 53 illustrated in FIG. 1.

Having described the plug valve of FIGS. 1 and 5 which may be comprised of lip insert means of a single-piece construction or comprised of a pair of U-shaped lip insert means, reference is now made to FIG. 9 of the drawings which illustrates another modification of the valve of FIGS. 1 and 5. The valve of FIG. 9 also has retaining shoulders 62 and retained surfaces 63; however, in this instance each of the annular retaining shoulders 62 when viewing one side thereof on any cross section normal to the one side has a straight retaining surface, as shown at 72, and the lip insert means 53 associated with a particular retaining shoulder 72 has a retained surface 63, as also shown at 72, which is straight in a corresponding manner. Each retained surface 63 engages its associated retaining surface 62 along substantially its full extent. It will also be seen that the arrangement of each set of surfaces 62 and 63 in the presentation of FIG. 9 is such that these surfaces 62–63 tend to diverge or flare away from an associated near port 46 in the sleeve 45.

As will be apparent from FIG. 1 of the drawings the bore 42 is a substantially frustoconical bore and has a slight taper toward the bottom of the valve which is generally of the order of 2°. The sleeve 45 and plug 50 have similar frustoconical shapes or tapers.

The sleeve 45 may be made of any suitable material and is preferably formed of a fluorinated hydrocarbon polymer such as polytetrafluoroethylene or equivalent material.

As seen in FIG. 5 the valve 35 also has body pressure ribs 74 and 75 which extend radially into the bore 42. The high pressure ribs 74 and 75 serve the same purpose as the high pressure ribs 28 and 30 described in the prior art plug valve of FIG. 3. In particular, the high pressure ribs 74 and 75 act through the plastic sleeve 45 to apply corresponding high pressure sealing areas on the plug 50. It will also be appreciated that by eliminating housing or body lips on the housing 36 which would be similar to the lips 31 and 32 of the housing 12 of valve 10 it is possible to grind or otherwise finish the surfaces 76 and 77 of the ribs 74 and 75 respectively with ease, precision, and economy whereby the ribs 74 and 75 of valve perform a better sealing function.

Each lip insert means 53 previously described is installed in position and serves the multiple purpose previously described of protecting the edge surface means 47 against impingement by fluid flowing through the flow passage 37, holding the sleeve 45 against rotation, preventing cold flow or extrusion of parts of the plastic sleeve 45 in the flow passage 37, and providing smooth uninterrupted flow of the fluid through such flow passage 37 of the valve 35.

Thus, each lip insert means 53 provides all the important characteristics of the integrally formed lips provided in the body or housing of a prior art valve.

Each lip insert means 53 is also easier to assemble in a new valve and makes its associated valve 35 easier to repair in the field. Further, the lip insert means 53 of the present invention eliminate the need for special sizing tools and other equipment which is necessary to assemble a sleeve into a conventional prior art valve having integrally formed lips in the outer housing or body. In addition, it is possible to replace the removable lip insert means of the valve 35 without replacing the entire valve housing or body 36 in the event of damage thereto. Finally, the use of integral lip insert means 53 drastically reduces the cost of the valve body or housing as specialized casting or forming techniques are no longer necessary to form such housing. Indeed, it has been found that the cost savings for the valve body or housing 36 more than offset any additional cost of the lip insert means 53.

The use of lip insert means 53 makes it possible to use different materials for the valve body or housing 36 and the lip insert means 53 themselves. For example, it is possible to cast the body or housing employing a cast iron while making the lip insert means 53 of a comparatively rigid metal such as a high strength steel. It is also possible to use lip insert means 53 made of other materials including non-metallic materials that possess the high rigidity necessary for successful operation of the valve.

Still another modification of lip insert means or lip insert 53 is shown in cross section in FIG. 10 of the drawings. The lip insert means 53 of FIG. 10 has a surface 57 which serves as a transition wall as described earlier; however, such lip insert means 53 has locking means for locking the lip insert means to the plastic sleeve 45. The locking means in this example comprises groove means or a groove 80 in the lip insert means 53. The groove 80 is of roughly rectangular outline and extends into the lip insert means from the concave roughly L-shaped surface 56 thereof. The groove 80 is particularly adapted to receive a correspondingly shaped projection in a modified (not shown) plastic sleeve 45 therewithin to provide what amounts to a locking action therebetween.

Yet another modification of lip insert means or lip insert 53 is shown in cross section in FIG. 11 of the drawings. The lip insert means of FIG. 11 also has a surface 57 which serves as a transition wall; and, the lip insert means 53 also has locking means for locking the lip insert means to the plastic sleeve. The locking means in this example comprises groove means or a groove 81 of roughly semicircular outline which extends from the concave L-shaped surface 56 into the lip insert means 53. The locking means further comprises an extension 82 extending from the lip insert means. The extension 82 has a base disposed against a concave roughly L-shaped surface 56 associated therewith. The groove 81 is also adapted to receive a correspondingly shaped projection in a modified (not shown) plastic sleeve 45 therewithin and the extension 82 is likewise adapted to be received in a modified channel in such sleeve 45 to provide a locking action.

In this disclosure of the invention it will be noted that the top cover, stem seals, and other standard portions of the valve 35 have not been illustrated or described. However, it will be appreciated that these components are of types normally provided in a plug type valve and may be of any suitable construction known in the art.

The plastic sleeve 45 is installed in position within the housing 36 of the valve 35 as is known in the art. Basically, such sleeve 45 is expanded and formed radially using a suitable tool after disposing the sleeve 45 in the bore 42 to thereby define the basic parts of the outer configuration of such sleeve.

While present exemplary embodiments of this invention, and methods of practicing the same, have been illustrated and described, it will be recognized that this invention may be otherwise variously embodied and practiced within the scope of the following claims.

What is claimed is:

1. In a plug valve for controlling fluid flow therethrough, said valve having, an outer housing, a flow passage extending through said housing and including an inlet and an outlet interconnected by a bore disposed therebetween, said bore having a central axis disposed substantially perpendicular to said flow passage, a plastic sleeve disposed within said housing and lining said bore, said sleeve having a pair of aligned ports therein at diametrically opposed locations each defined by annular edge surface means, said ports being aligned with said inlet and outlet to enable fluid flow through said passage, a rotatable plug disposed within said sleeve, said plug having an opening therethrough which is adapted to be aligned in and out of registry with said inlet and outlet in accordance with rotation of said plug relative to said sleeve and housing, and means holding said sleeve against rotation relative to said housing, the improvement wherein said holding means comprises, removable lip insert means of roughly annular outline disposed against one of said edge surface means and against said housing, said lip insert means serving the multiple purpose of protecting said one edge surface means against impingement by fluid flowing through said flow passage, holding said sleeve against said rotation, preventing cold flow or extrusion of parts of said plastic sleeve in said flow passage, and providing smooth uninterrupted flow of said fluid through said flow passage.

2. A valve as set forth in claim 1 and further comprising at least another removable lip insert means which is substantially identical to said first-named lip insert means, said other lip insert means being disposed against the other of said edge surface means and against said housing, said other lip insert means also serving a multiple purpose identical to said first-named multiple purpose.

3. A valve as set forth in claim 2 in which each of said annular lip insert means has a roughly rectangular peripheral outline.

4. A valve as set forth in claim 2 in which each of said annular lip insert means is a single-piece construction.

5. A valve as set forth in claim 3 in which each of said annular lip insert means consists of a pair of cooperating U-shaped members, each of said U-shaped members having a bight and a pair of substantially parallel legs, each pair of said U-shaped members defining each annular lip insert means being disposed with the terminal ends of their parallel legs in abutting relation and defining the rectangular outline of their associated lip insert means.

6. A valve as set forth in claim 2 in which each of said edge surface means when viewed in cross section at any location on the periphery thereof has a convex roughly L-shaped surface and each annular lip insert means when installed in said valve and viewed in cross section at the said location has a corresponding concave and roughly L-shaped surface which is disposed against said convex surface in a hooking manner.

7. A valve as set forth in claim 2 in which each of said annular lip insert means has an inside surface defining an annular wall which is a smooth transition wall between said opening in said plug and the associated portion of said flow passage through said housing.

8. A valve as set forth in claim 7 in which said annular wall is also of roughly rectangular peripheral outline and has rounded inside corners.

9. A valve as set forth in claim 6 in which said housing has an annular retaining shoulder associated with its inlet and a substantially identical retaining shoulder associated with its outlet, each of said retaining shoulders cooperating with an associated edge surface means of said sleeve to confine an associated lip insert means against movement along said flow passage.

10. A valve as set forth in claim 9 in which each of said annular retaining shoulders when viewing one side thereof on any cross section normal to said one side is curved in a concave manner toward said central axis of said bore and the lip insert means associated with a particular retaining shoulder and has a retained surface which is correspondingly curved in a convex manner away from said central axis, said retained surface engaging said retaining surface along substantially its full extent.

11. A valve as set forth in claim 9 in which each of said annular retaining shoulders when viewing one side thereof on any cross section normal to said one side has a straight retaining surface and the lip insert means associated with a particular retaining shoulder has a retained surface which is straight in a corresponding manner, said retained surface engaging said retaining surface along substantially its full extent.

12. A valve as set forth in claim 2 in which each of said lip insert means is made of a comparatively rigid material.

13. A valve as set forth in claim 6 and further comprising locking means for locking each of said lip insert means to said plastic sleeve.

14. A valve as set forth in claim 13 in which said locking means comprises groove means in each of said lip insert means, said groove means extending inwardly into its lip insert means from the concave roughly L-shaped surface thereof.

15. A valve as set forth in claim 14 in which said locking means further comprises an extension extending from each of said lip insert means, each of said extensions having a base disposed against an associated concave roughly L-shaped surface means.

16. In a method of making a plug valve for controlling fluid flow therethrough, said method comprising the steps of, providing an outer housing, forming a flow passage extending through said housing and including an inlet and an outlet interconnected by a bore disposed therebetween, said bore having a central axis disposed substantially perpendicular to said flow passage, providing a plastic sleeve within said housing and lining said bore, said sleeve having a pair of aligned ports therein at diametrically opposed locations each defined by annular edge surface means, aligning said ports with said inlet and outlet in said housing to enable fluid flow through said passage, disposing a rotatable plug within said sleeve, said plug having an opening therethrough which is adapted to be aligned in and out of registry with said inlet and outlet in accordance with rotation of said plug relative to said sleeve and housing, and providing holding means for holding said sleeve against rotation relative to said housing, the improvement in said method wherein said step of providing holding means comprises providing removable lip insert means of roughly annular outline and disposing said lip insert means against one of said edge surface means and against said housing, said lip insert means serving the multiple purpose of protecting said one edge surface means against impingement by fluid flowing through said flow passage, holding said sleeve against said rotation, preventing cold flow or extrusion of parts of said plastic sleeve in said flow passage, and providing smooth uninterrupted flow of said fluid through said flow passage.

17. A method as set forth in claim 16 and comprising the further step of providing at least another removable lip insert means which is substantially identical to said first-named lip insert means and disposing said other lip insert means against the other of said edge surface means and against said housing, said other lip insert means also seving a multiple purpose identical to said first-named multiple purpose.

18. A method as set forth in claim 17 in which said steps of providing annular lip insert means comprises providing each of said annular lip insert means having a roughly rectangular peripheral outline.

19. A method as set forth in claim 18 in which said steps of providing annular lip insert means comprises providing each of said annular lip insert means as a single-piece construction.

20. A method as set forth in claim 19 in which said steps of providing annular lip insert means comprises providing each of said annular lip insert means consisting of a pair of cooperating U-shaped members, each of said U-shaped members having a bight and a pair of substantially parallel legs, and disposing each pair of said U-shaped members defining each annular lip insert means with the terminal ends of their parallel legs in abutting relation to define the rectangular outline of their associated lip insert means.

21. A method as set forth in claim 17 in which said step of providing said plastic sleeve comprises providing said plastic sleeve having said edge surface means wherein each edge surface means when viewed in cross section at any location on the periphery thereof has a convex roughly J-shaped surface and each annular lip insert means when installed in said valve and viewed in cross section at the said location has a corresponding concave and roughly J-shaped surface which is disposed against said convex surface in a hooking manner.

22. A method as set forth in claim 18 in which said step of providing lip insert means comprises providing each of said annular lip insert means having an inside surface defining an annular wall which is a smooth transition wall between said opening in said plug and the associated portion of said flow passage through said housing.

23. A method as set forth in claim 17 in which said step of providing lip insert means comprises providing lip insert means each made of comparatively rigid material.

24. A method as set forth in claim 23 in which said step of providing lip insert means comprises providing lip insert means each made of a hard metallic material.

* * * * *